Dec. 11, 1951   F. R. FORD   2,578,413
PRESSURE ROLLER BENDING DEVICE FOR DUPLICATING MACHINES
Filed May 28, 1949
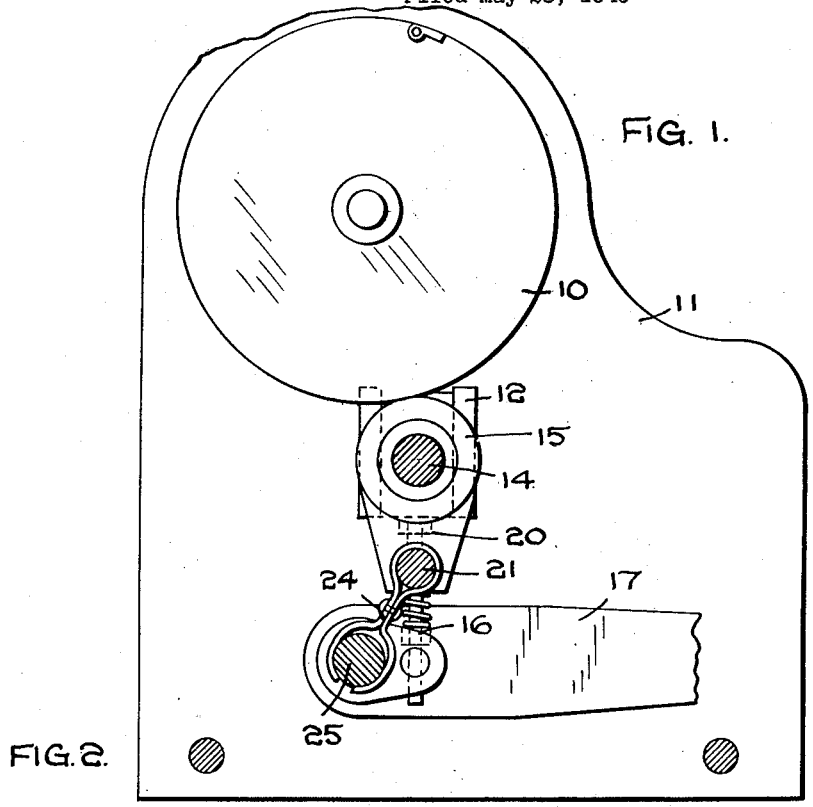
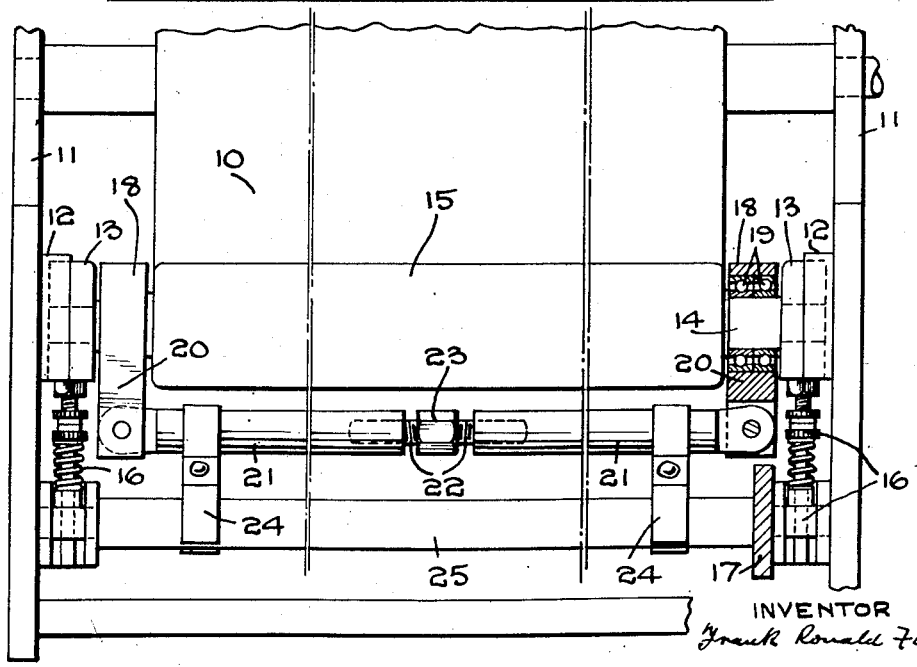
INVENTOR
Frank Ronald Ford.
By Richardson, David and Nordon
ATTYS Patented Dec. 11, 1951

2,578,413

UNITED STATES PATENT OFFICE 2,578,413

PRESSURE ROLLER BENDING DEVICE FOR DUPLICATING MACHINES

Frank Ronald Ford, Sparkbrook, Birmingham, England

Application May 28, 1949, Serial No. 96,016
In Great Britain June 3, 1948

4 Claims. (Cl. 101—216)

1

This invention relates to duplicating machines of the kind wherein a master sheet having the matter to be reproduced marked thereon in reverse is clamped to a cylinder, and the copy sheets are passed between a pressure roller and the master sheet on the cylinder when the latter is revolved.

In machines of this class the pressure roller is usually made of rubber with a metal shaft extending through it and projecting from its ends. The pressure roller is necessarily at least as long as the cylinder, and the pressure of the pressure roller on the cylinder is obtained by mounting the ends of the pressure roller spindle in bearings mounted in guides and acted upon by springs the pressure of which can usually be adjusted, the spring pressure acting in a direction towards the axis of the cylinder. It has been found in practice that this construction, particularly in machines having long cylinders and long pressure rollers, results in a tendency to bend the spindle of the pressure roller very slightly but sufficiently to have the effect of producing faint reproduction of the matter disposed at the middle of the length of the cylinder and heavier reproduction of the matter disposed near the ends of the cylinder.

The object of the present invention is to overcome this difficulty, and according to the present invention each end portion of the pressure roller spindle is provided with a bracket in which the spindle rotates, these brackets being situated between the pressure roller bearings and the ends of the pressure roller, and these brackets each being provided with an arm which is disposed approximately radially in relation to the cylinder, the arms extending away from the cylinder and being connected together by a tie-bar the length of which can be adjusted so that bending moment can be applied to the pressure roller spindle in the opposite direction to that produced by the pressure of the spindle bearings and the reaction from the cylinder. In this way the tendency for the spindle to bend, so that pressure is not uniform along the length of the cylinder, can be corrected and uniform reproduction along the length of the cylinder can be obtained.

One or two spaced ball or roller bearings may be mounted in each bracket and may engage the spindle of the pressure roller, and the tie-bar may be made in three parts, one attached to each bracket and a third part being in the form of a right- and left-hand screw engaging in the ends of the other two parts, so that by turning the third part the effective length of the tie-bar

2 can be adjusted. This adjustment may be made until uniform reproduction along the length of the cylinder is obtained.

Referring to the drawings:

Figure 1 is a section through a duplicating machine showing the pressure roller assembly; and Figure 2 is an end view of the assembly.

In the construction as shown the master sheet cylinder 10 is supported between side plates 11, which are provided with guides 12 for the bearings 13 which carry the ends of the spindle 14 of the pressure roller 15.

The bearings 13 are slidable in the guides 12, and any conventional means may be used to vary the pressure applied to the bearings, such as the arrangement indicated generally at 16, including an operating lever 17 for varying the pressure.

In accordance with the invention brackets 18 are rotatably mounted on the spindle 14 by means of ball bearings 19, each bracket having an arm 20 which is bifurcated and to which is pivotally attached a rod 21, these rods forming the two outer parts of the tie-bar.

The inner end of each rod 21 is screwthreaded, the threads being of opposite hand, and the third part of the tie-rod comprises an adjusting screw 22 having opposite threaded portions and provided with a nut 23 by which it may be turned to shorten or lengthen the effective length of the tie-bar.

To prevent the tie-rod from swinging about the bearings, clips 24 are provided which engage the rod 25.

What I claim then is:

1. In a duplicating machine of the kind specified having a master sheet cylinder and a pressure roller cooperating therewith, the pressure roller having a spindle the ends of which are mounted in bearings disposed in fixed guides and acted upon by spring means in a direction towards the axis of the master cylinder; the combination of a bracket on each end of said spindle, each bracket having an arm extending away from the cylinder a tie-bar connected between the free ends of said arms and means for adjusting the length of the tie-bar between said ends so that bending moment can be applied to the spindle in the opposite direction to that produced by pressure of the spindle bearings and the reaction from the master sheet cylinder.

2. In a duplicating machine of the kind specified having a master sheet cylinder and a pressure roller cooperating therewith, the pressure roller having a spindle the ends of which are mounted in bearings disposed in fixed guides and acted upon by spring means in a direction towards the axis of the master cylinder; the combination of a bracket rotatably mounted upon ball bearings on each end of the spindle, each bracket having an arm disposed approximately radially in relation to the master sheet cylinder a tie-bar connected between the free ends of said arms and means for adjusting the length of the tie-bar between said ends so that bending moment can be applied to the spindle in the opposite direction to that produced by pressure of the spindle bearings and the reaction from the master sheet cylinder.

3. In a duplicating machine of the kind specified having a master sheet cylinder and a pressure roller cooperating therewith, the pressure roller having a spindle the ends of which are mounted in bearings disposed in fixed guides and acted upon by spring means in a direction towards the axis of the master cylinder; the combination of a bracket on each end of said spindle, each bracket having an arm extending away from the cylinder, each of said arms having a rod pivotally attached by one end to the free end thereof, said rods being disposed approximately parallel to the axis of the pressure roller and extending inwardly towards each other; a screwthreaded portion on the inner end of one rod; a screwthreaded portion of opposite hand on the inner end of the other rod; and an adjusting member having corresponding screwthreads engaging said portions and capable of rotation whereby the effective length of the two rods can be varied, so that bending moment can be applied to the spindle in the opposite direction to that produced by pressure of the spindle bearings and the reaction from the master sheet cylinder.

4. In a duplicating machine of the kind specified having a master sheet cylinder and a pressure roller cooperating therewith, the pressure roller having a spindle the ends of which are mounted in bearings disposed in fixed guides and acted upon by spring means in a direction towards the axis of the master cylinder; the combination of a bracket on each end of said spindle, each bracket having an arm extending away from the cylinder, each of said arms having a rod pivotally attached by one end to the free end thereof, said rods being disposed approximately parallel to the axis of the pressure roller and extending inwardly towards each other; a screwthreaded hole in the inner end of one rod; a screwthreaded hole of opposite hand in the inner end of the other rod; and an adjusting screw with corresponding screwthreads engaging said holes and provided with an operating nut whereby it may be turned to adjust the effective length of the two rods, so that bending moment can be applied to the spindle in the opposite direction to that produced by pressure of the spindle bearings and the reaction from the master sheet cylinder.

FRANK RONALD FORD.

REFERENCES CITED

The following references are of record in the file of this patent:

UNITED STATES PATENTS

| Number | Name | Date |
|---|---|---|
| 170,542 | Firm | Nov. 30, 1875 |
| 1,569,064 | Archibald | Jan. 12, 1926 |
| 2,165,972 | Kokay | July 11, 1939 |